(12) United States Patent
Sahara et al.

(10) Patent No.: US 7,800,267 B2
(45) Date of Patent: Sep. 21, 2010

(54) BRUSHLESS MOTOR AND MANUFACTURING METHOD THEREOF

(75) Inventors: Yoshimichi Sahara, Toyohashi (JP); Masato Ooishi, Hamamatsu (JP); Tatsuya Kawai, Hamamatsu (JP); Bungo Mizutani, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 98 days.

(21) Appl. No.: 12/292,502

(22) Filed: Nov. 20, 2008

(65) Prior Publication Data
US 2009/0152967 A1    Jun. 18, 2009

(30) Foreign Application Priority Data
Dec. 13, 2007    (JP) .............................. 2007-321940

(51) Int. Cl.
*H02K 5/16*    (2006.01)
(52) U.S. Cl. ............................. 310/90; 310/52; 310/401
(58) Field of Classification Search ............. 310/52–53, 310/89–91, 401–402, 264
See application file for complete search history.

(56) References Cited

U.S. PATENT DOCUMENTS

| | | | | | |
|---|---|---|---|---|---|
| 4,554,491 | A | * | 11/1985 | Plunkett | ................ 318/400.41 |
| 4,682,065 | A | * | 7/1987 | English et al. | ................ 310/90 |
| 4,757,222 | A | * | 7/1988 | Shiraki et al. | ............. 310/68 B |
| 5,663,604 | A | * | 9/1997 | Takahashi | ..................... 310/91 |
| 5,783,888 | A | * | 7/1998 | Yamano | ..................... 310/91 |
| 5,925,948 | A | * | 7/1999 | Matsumoto | ............... 310/67 R |
| 5,973,428 | A | * | 10/1999 | Zakrocki et al. | ............... 310/71 |
| 6,023,117 | A | * | 2/2000 | Chen | ......................... 310/91 |
| 6,713,907 | B2 | * | 3/2004 | Matsumoto | ............... 310/67 R |
| 7,659,644 | B2 | * | 2/2010 | Fukuno et al. | ................ 310/51 |
| 2007/0273228 | A1 | * | 11/2007 | Tanaka et al. | ................. 310/90 |

FOREIGN PATENT DOCUMENTS

| DE | 10161366 A1 | 6/2003 |
|---|---|---|
| JP | A-8-47199 | 2/1996 |
| JP | A-2000-262004 | 9/2000 |
| JP | A-2006-50848 | 2/2006 |

* cited by examiner

*Primary Examiner*—Thanh Lam
(74) *Attorney, Agent, or Firm*—Posz Law Group, PLC

(57) ABSTRACT

A second ball bearing is installed from a first axial side toward a second axial side into an interior of a bearing holder of a rotor through an opening of the bearing holder, so that an outer race of the second ball bearing is press fitted to an inner peripheral portion of the interior of the bearing holder. A first ball bearing is inserted from the first axial side toward the second axial side into the interior of the bearing holder of the rotor through the opening of the bearing holder after the installing of the second ball bearing, so that an outer race of the first ball bearing is press fitted to the inner peripheral portion of the interior of the bearing holder and is axially spaced from the outer race of the second ball bearing.

8 Claims, 17 Drawing Sheets

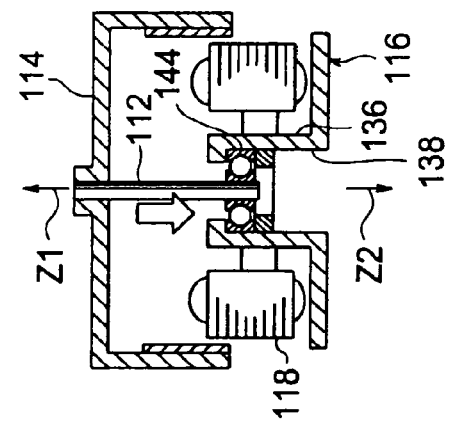
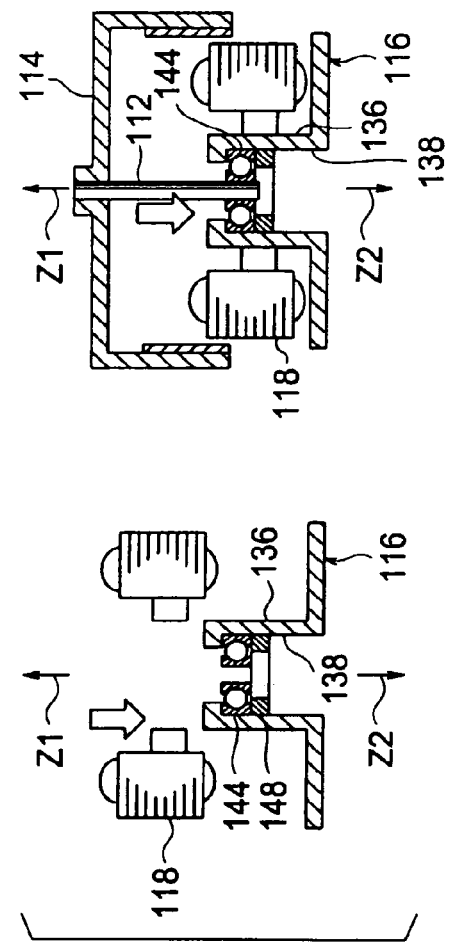
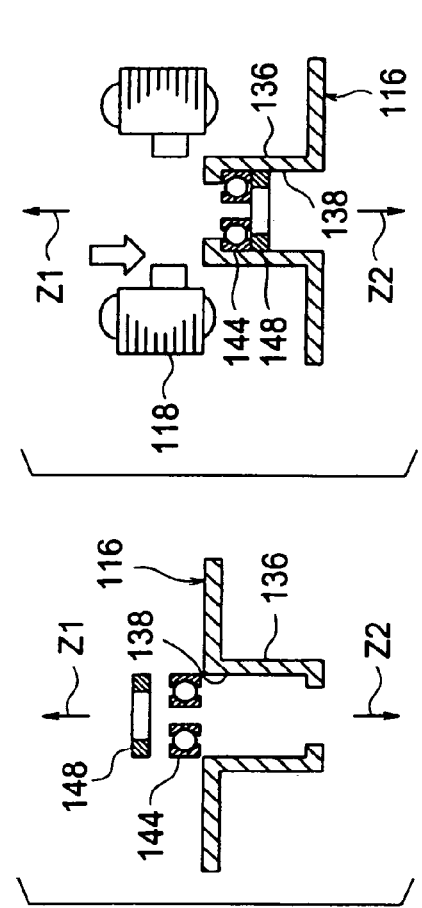
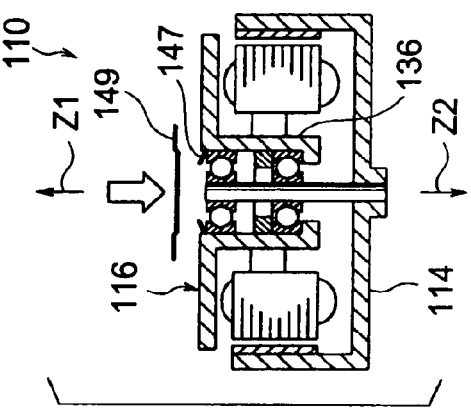
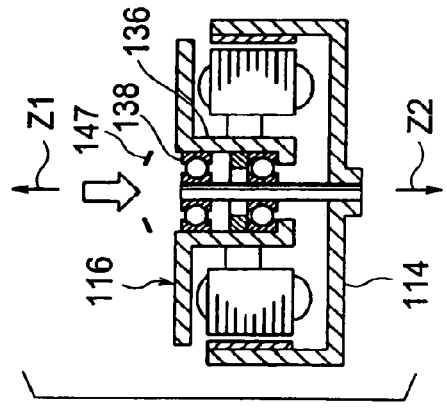
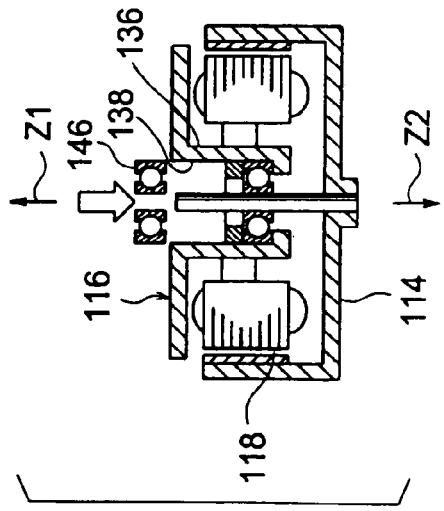

US 7,800,267 B2

BRUSHLESS MOTOR AND MANUFACTURING METHOD THEREOF

CROSS REFERENCE TO RELATED APPLICATION

This application is based on and incorporates herein by reference Japanese Patent Application No. 2007-321940 filed on Dec. 13, 2007.

BACKGROUND OF THE INVENTION

1. Field of the Invention

The present invention relates to a brushless motor and a manufacturing method thereof.

2. Description of Related Art

In a previously known type of brushless motor, a rotor is rotatably supported relative to a motor shaft through two ball bearings (see, for example, Japanese Unexamined Patent Publication No. H08-047199). Japanese Unexamined Patent Publication No. H08-047199 discloses a spindle motor. In the case of Japanese Unexamined Patent Publication No. H08-047199, a generally cylindrical bearing holder is formed in a rotor, and two ball bearings are received in an interior of the bearing holder such that the ball bearings are spaced from each other in an axial direction of a stationary shaft. The rotor is supported by the ball bearings in a rotatable manner relative the stationary shaft, which is held by a bracket.

However, in the case of Japanese Unexamined Patent Publication No. H08-047199, the bearing holder is placed radially inward of the stator, around which windings (acting as heating elements) are wound. Thus, the heat from the stator can be easily conducted to the ball bearings, which are received in the interior of the bearing holder. Thereby, the bearings need to be highly heat resistant, so that costs of the brushless motor are disadvantageously increased.

Furthermore, in the case of Japanese Unexamined Patent Publication No. H08-047199, two large diameter portions (increased diameter portions) are provided at two axially opposed ends, respectively, of an inner bore of the bearing holder to hold the ball bearings, respectively. Thus, in order to install the ball bearings in the same common direction, the rotor needs to be inverted after installation of one of the ball bearings into the bearing holders prior to installation of the other one of the ball bearings into the bearing holder. Therefore, the work efficiency is reduced, and the costs are increased.

SUMMARY OF THE INVENTION

The present invention addresses the above disadvantages. Thus, it is an objective of the present invention to provide a brushless motor and a manufacturing method thereof, which enable cost reduction.

To achieve the objective of the present invention, there is provided a brushless motor, which includes a motor shaft, a rotor and a centerpiece. The motor shaft is stationary held and extends between a first axial side and a second axial side. The rotor is rotatable about the motor shaft and includes a generally cylindrical bearing holder, which is placed on a radially outer side of the motor shaft and extends in an axial direction of the motor shaft. The centerpiece is placed on the second axial side of the rotor and includes a motor shaft holder, an axial wall and a connecting wall. The motor shaft holder is coaxial with the bearing holder and securely holds the motor shaft. The axial wall is placed radially outward of the motor shaft holder and of the bearing holder and is radially spaced from the bearing holder by a gap. The axial wall extends in the axial direction of the motor shaft, and an axial extent of the axial wall at least partially overlaps with an axial extent of the bearing holder in the axial direction of the motor shaft. The connecting wall connects between the motor shaft holder and the axial wall on the second axial side of the bearing holder. A plurality of cooling air inlet openings axially penetrates through the connecting wall in the axial direction of the motor shaft. The first ball bearing is received in an interior of the bearing holder and has an inner race, which receives the motor shaft, and an outer race, which is held by an inner peripheral portion of the interior of the bearing holder. The second ball bearing is received in the interior of the bearing holder and is axially spaced from the first ball bearing on the second axial side thereof. The second ball bearing has an inner race, which receives the motor shaft, and an outer race, which is held by the inner peripheral portion of the interior of the bearing holder. The stator is securely held by the axial wall of the centerpiece and generates a rotational magnetic field to rotate the rotor upon energization of the stator.

To achieve the objective of the present invention, there is also provided a manufacturing method of a brushless motor. According to the manufacturing method, a second ball bearing is installed from a first axial side toward a second axial side into an interior of a bearing holder of a rotor through an opening of the bearing holder, so that an outer race of the second ball bearing is press fitted to an inner peripheral portion of the interior of the bearing holder. Furthermore, a first ball bearing is installed from the first axial side toward the second axial side into the interior of the bearing holder of the rotor through the opening of the bearing holder after the installing of the second ball bearing, so that an outer race of the first ball bearing is press fitted to the inner peripheral portion of the interior of the bearing holder and is axially spaced from the outer race of the second ball bearing.

BRIEF DESCRIPTION OF THE DRAWINGS

The invention, together with additional objectives, features and advantages thereof, will be best understood from the following description, the appended claims and the accompanying drawings in which:

FIGS. 15A to 15F are schematic diagrams showing an assembling procedure of the first comparative example of the brushless motor;

DETAILED DESCRIPTION OF THE INVENTION

Figure 1:
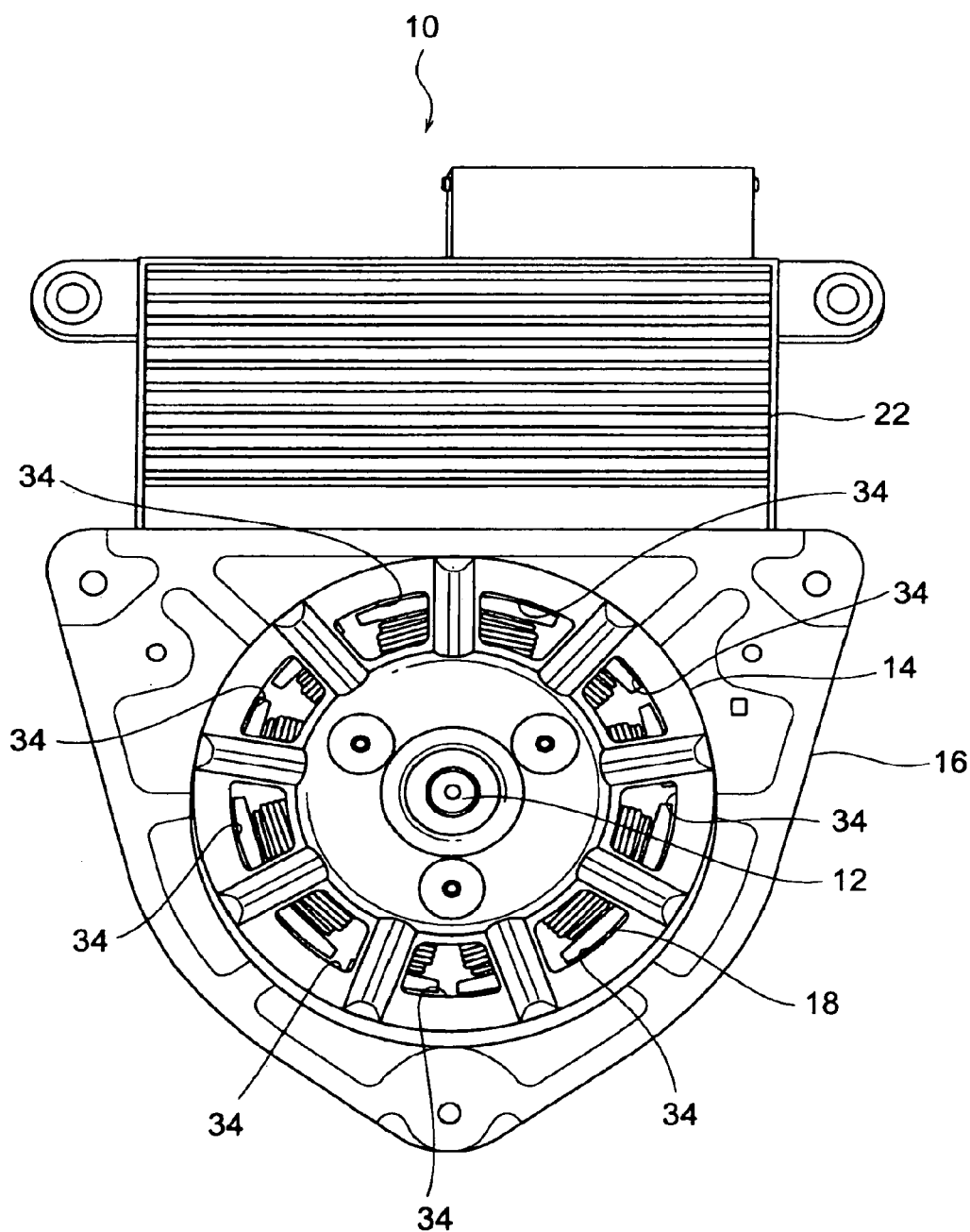
FIG. 1 is a plan view of a brushless motor according to an embodiment of the present invention.

A brushless motor according to an embodiment of the present invention will be described with reference to the accompanying drawings.

FIGS. 1 to 7 show a structure of the brushless motor 10 of the present embodiment. The brushless motor 10 is suitable as, for example, a fan motor of a vehicle (e.g., an automobile), which is used to cool a radiator of the vehicle. The brushless motor 10 includes a motor shaft 12, a rotor 14, a centerpiece 16, a stator 18, a control unit 20 and a heat sink 22.

Figure 4:
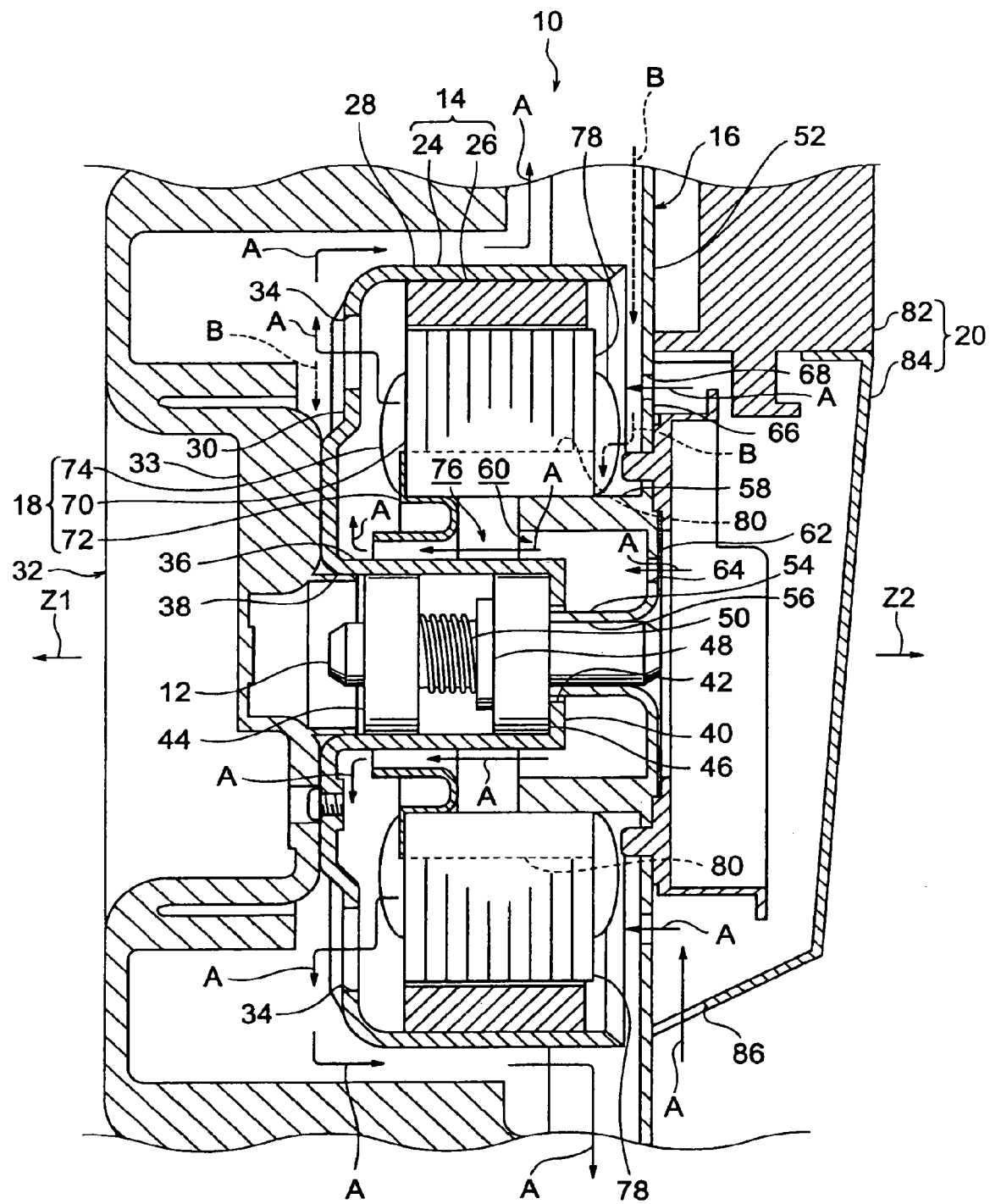
FIG. 4 is a partial enlarged cross sectional view of the brushless motor of the embodiment.

As shown in FIG. 4, the rotor 14 includes a rotor housing 24 and a plurality of rotor magnets 26. The rotor housing 24 is made of metal (e.g., iron) and is integrally formed into a generally cylindrical cup-shaped body through a die casting process, a press working process or the like. Specifically, the rotor housing 24 includes a generally cylindrical portion 28 and a bottom portion 30. The magnets 26 are fixed to an inner peripheral surface of the cylindrical portion 28 such that the magnets 26 are arranged one after another in a circumferential direction of the cylindrical portion 28. A blower fan 32 is integrally rotatably installed to the rotor housing 24. A plurality of cooling air outlet openings 34 is formed in the bottom portion 30 of the rotor housing 24.

At a center part of the bottom portion 30 of the rotor housing 24, a generally cylindrical bearing holder 36 extends in an axial direction of the motor shaft 12 at a location radially outward of the motor shaft 12. The bearing holder 36 has an opening 38 at one axial side (Z1 side) of the motor shaft 12 and a bottom portion 40 at the other axial side (Z2 side) of the motor shaft 12. The one axial side (the Z1 side) and the other axial side (the Z2 side) may also be referred to as a first axial side and a second axial side, respectively.

Figure 5:
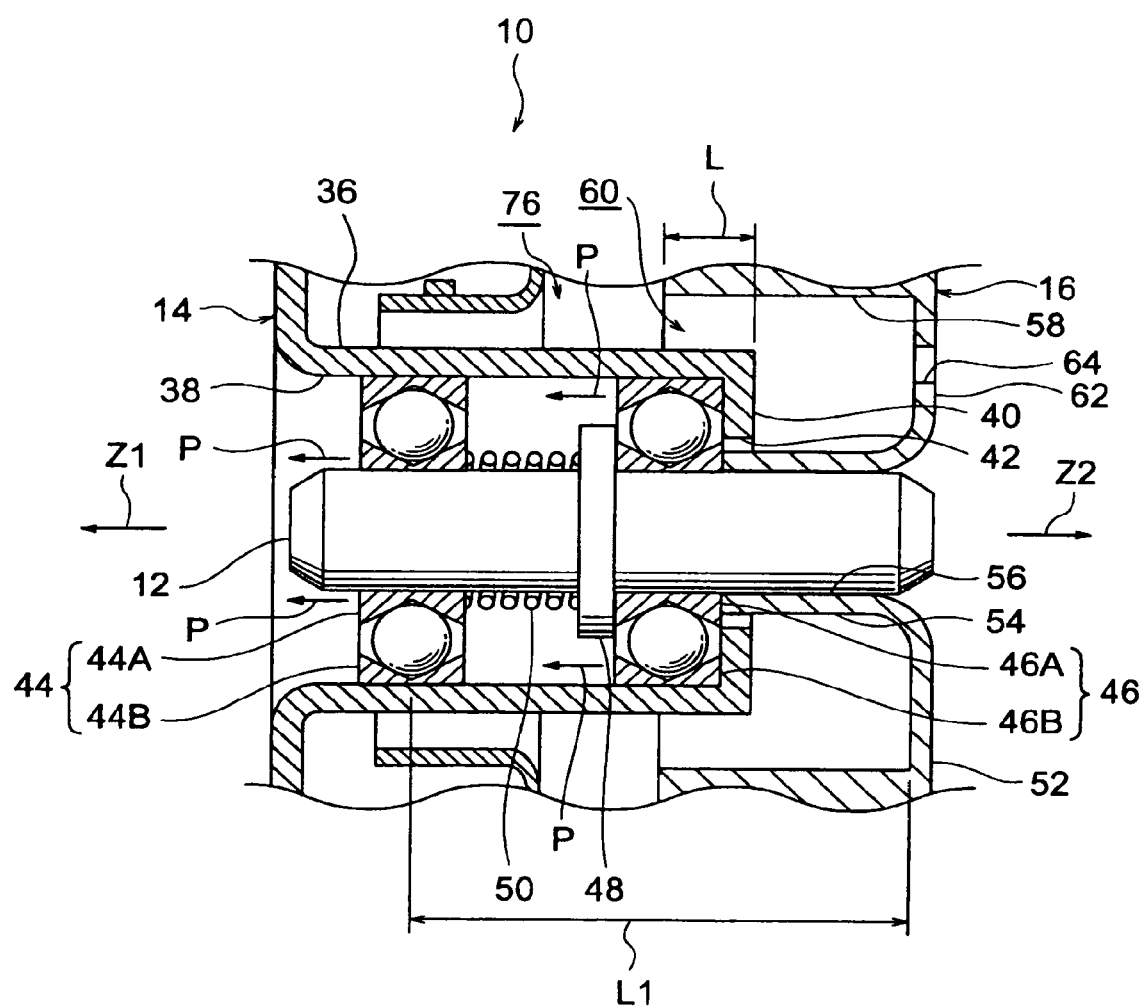
FIG. 5 is a partial enlarged cross sectional view of the brushless motor of the embodiment.
Figure 6:
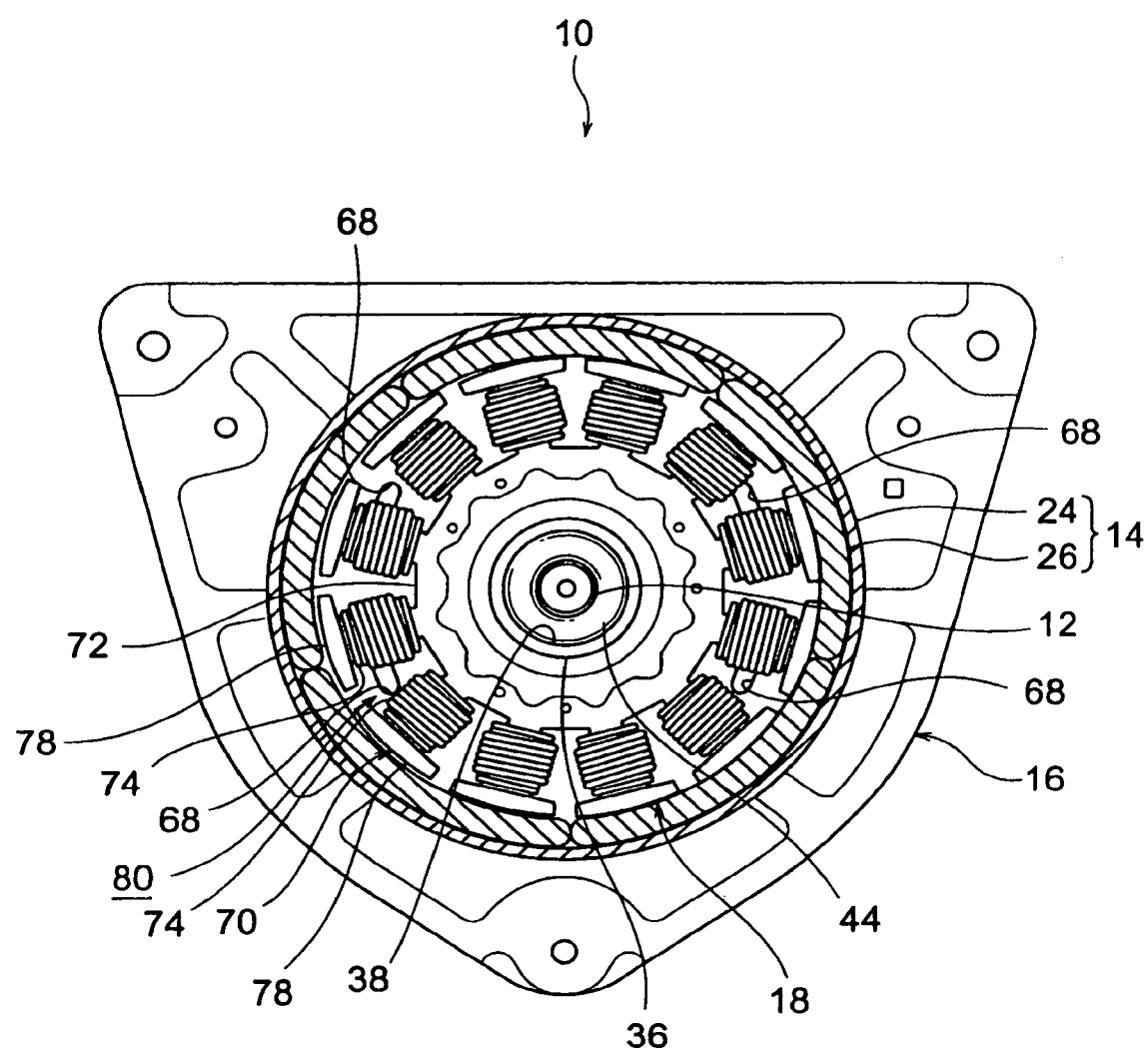
FIG. 6 is a partial cross sectional plan view of the brushless motor of the embodiment.
Figure 7:
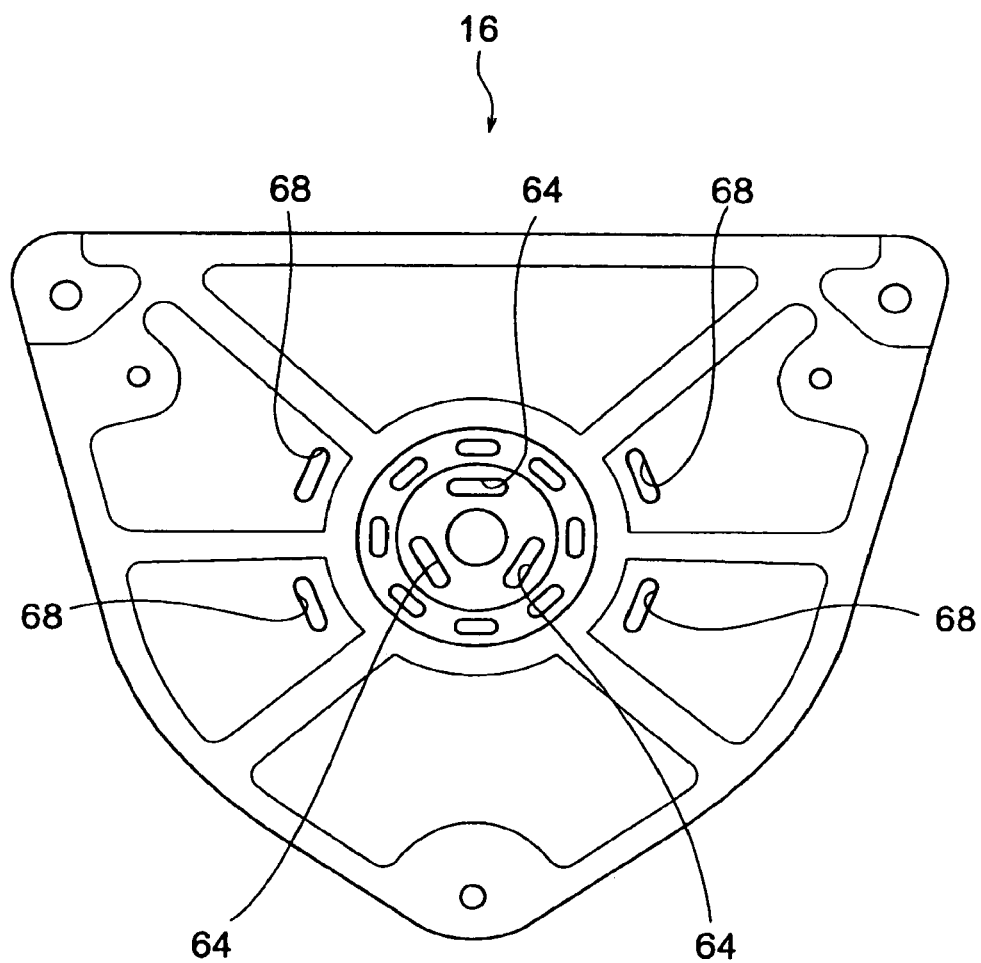
FIG. 7 is a bottom view of a centerpiece of the brushless motor of the embodiment.

As shown in FIG. 5, the bottom portion 40 supports an outer race 46B of a second ball bearing 46, which will be described below in detail, from the other axial side (the Z2 side). A through hole 42 extends through a center part of the bottom portion 40 in the axial direction of the motor shaft 12. A first ball bearing 44, the second ball bearing 46, a bush 48 and a spring (e.g., a coil spring) 50 are received in the interior of the bearing holder 36.

The first ball bearing 44 includes an inner race 44A and an outer race 44B. One end portion of the motor shaft 12 on the one axial side (the Z1 side) is received through the inner race 44A, and the outer race 44B is press fitted to an inner peripheral surface (inner peripheral portion) of the bearing holder 36.

The second ball bearing 46 is spaced from the first ball bearing 44 on the other axial side (the Z2 side) of the motor shaft 12 and includes an inner race 46A and the outer race 46B. The other end portion of the motor shaft 12 on the other axial side (the Z2 side) is received through the inner race 46A, and the outer race 46B is press fitted to the inner peripheral surface of the bearing holder 36.

The bush 48 is received in the bearing holder 36 to support the inner race 46A of the second ball bearing 46 from the one axial side (the Z1 side) of the motor shaft 12. Furthermore, the motor shaft 12 is press fitted into the bush 48.

The spring 50 is interposed between the bush 48 and the first ball bearing 44 and urges the inner race 44A of the first ball bearing 44 away from the inner race 46A of the second ball bearing 46 toward the one axial side (the Z1 side). As indicated by an arrow P in FIG. 5, a pre-load is applied to the inner race 44A of the first ball bearing 44 and the outer race 46B of the second ball bearing 46 toward the one axial side (the Z1 side) of the motor shaft 12.

Furthermore, the interior, i.e., the inner bore of the bearing holder 36 has a generally constant cross sectional area in the axial direction of the motor shaft 12. Specifically, an inner diameter of the interior of the bearing holder 36 is generally constant from the opening 38 to the bottom portion 40. Thereby, the bearing holder 36 permits installation of the first ball bearing 44, the second ball bearing 46, the bush 48 and the spring 50 into the interior of the bearing holder 36 through the opening 38 of the bearing holder 36 from the one axial side (the Z1 side) of the motor shaft 12.

The centerpiece 16 is made of metal (e.g., iron) and is integrally formed through, for example, a die casting process. The centerpiece 16 is placed on the other axial side (the Z2 side) of the motor shaft 12 relative to the rotor 14, as shown in FIG. 4. The centerpiece 16 includes a generally planar main body 52, which extends in a radial direction of the motor shaft 12. A generally cylindrical motor shaft holder 54 projects from a center part of the main body 52 toward the one axial side (the Z1 side).

A holding hole 56 is formed in the motor shaft holder 54 and extends coaxially with the through hole 42. The other end portion of the motor shaft 12 on the other axial end side (the Z2 side) is press fitted into and is held in the holding hole 56. As shown in FIG. 5, an end part of the motor shaft holder 54, which is located on the one axial side (the Z1 side), supports the inner race 46A of the second ball bearing 46 through the through hole 42 from the other axial side (the Z2 side).

Furthermore, the main body 52 has an axial wall 58, which surrounds the bearing holder 36 on a radially outward of the bearing holder 36 and axially projects toward the one axial side (the Z1 side). The axial wall 58 forms a gap 60 relative to the bearing holder 36. Also, the axial wall 58 is axially overlapped with a part of the bearing holder 36 on the other axial end side (the Z2 side) of the motor shaft 12, that is, an axial extent of the axial wall 58 partially overlaps with an axial extent of the bearing holder 36 (thereby, the axial wall 58 having an overlapping length L).

Furthermore, the main body 52 has a connecting wall 62, which connects between a part of the motor shaft holder 54 and a part of the axial wall 58 on the other axial side (the Z2 side) of the bearing holder 36. A plurality (three in this instance) of cooling air inlet holes 64 extends through the connecting wall 62 in the axial direction of the motor shaft 12. The cooling air inlet holes 64 are arranged one after another at generally equal intervals in the circumferential direction of the motor shaft 12. The cooling air inlet holes 64 are provided at locations, which overlap with the bottom portion 40 in the radial direction of the motor shaft 12. That is, a radial extent of each of the cooling air inlet openings 64 at least partially overlaps with a radial extent of the bottom portion 40 of the bearing holder 36 in the radial direction of the motor shaft 12. In other words, at least a portion of each cooling air inlet hole 64 is aligned with the bottom portion 40 in a direction parallel to the axial direction of the motor shaft 12.

Furthermore, as shown in FIG. 4, the main body 52 has a peripheral portion 66 on an outer side of the connecting wall 62 in the radial direction of the motor shaft 12. The peripheral portion 66 has a plurality of winding cooling holes 68, which extend through the peripheral portion 66 in the axial direction of the motor shaft 12 and are arranged one after another in the circumferential direction of the motor shaft 12. The winding cooling holes 68 are placed at locations, which overlap with the corresponding slots 80, respectively, of a stator core 70 (described below in greater detail) in the radial direction of the motor shaft 12. That is, at least a portion of each winding cooling hole 68 is aligned with the corresponding slot 80 in a direction parallel to the axial direction of the motor shaft 12.

The stator 18 includes the stator core 70, an insulator 72 and windings 74. The stator core 70 is configured into an annular body and has an inner peripheral portion. When the inner peripheral portion of the stator core 70 is press fitted to an outer peripheral portion of the axial wall 58, the stator core 70 is assembled integrally with the centerpiece 16. A communication passage 76 is defined between the stator core 70 and the shaft holding portion 36 in the radial direction of the motor shaft 12 and is communicated with the gap 60.

The communication passage 76 extends in the axial direction of the motor shaft 12 and is opened at the opposite side of the communication passage 76, which is axially opposite from the gap 60, toward the one axial side (the Z1 side) in the stator 18.

The windings 74 are wound around the corresponding teeth 78 of the stator core 70 through the insulator 72 and are electrically connected to a control circuit 82 described below. The stator 18 generates a rotational magnetic field upon energization of the windings 74 to rotate the rotor 14 according to a control signal received from the control circuit 82.

Figure 2:
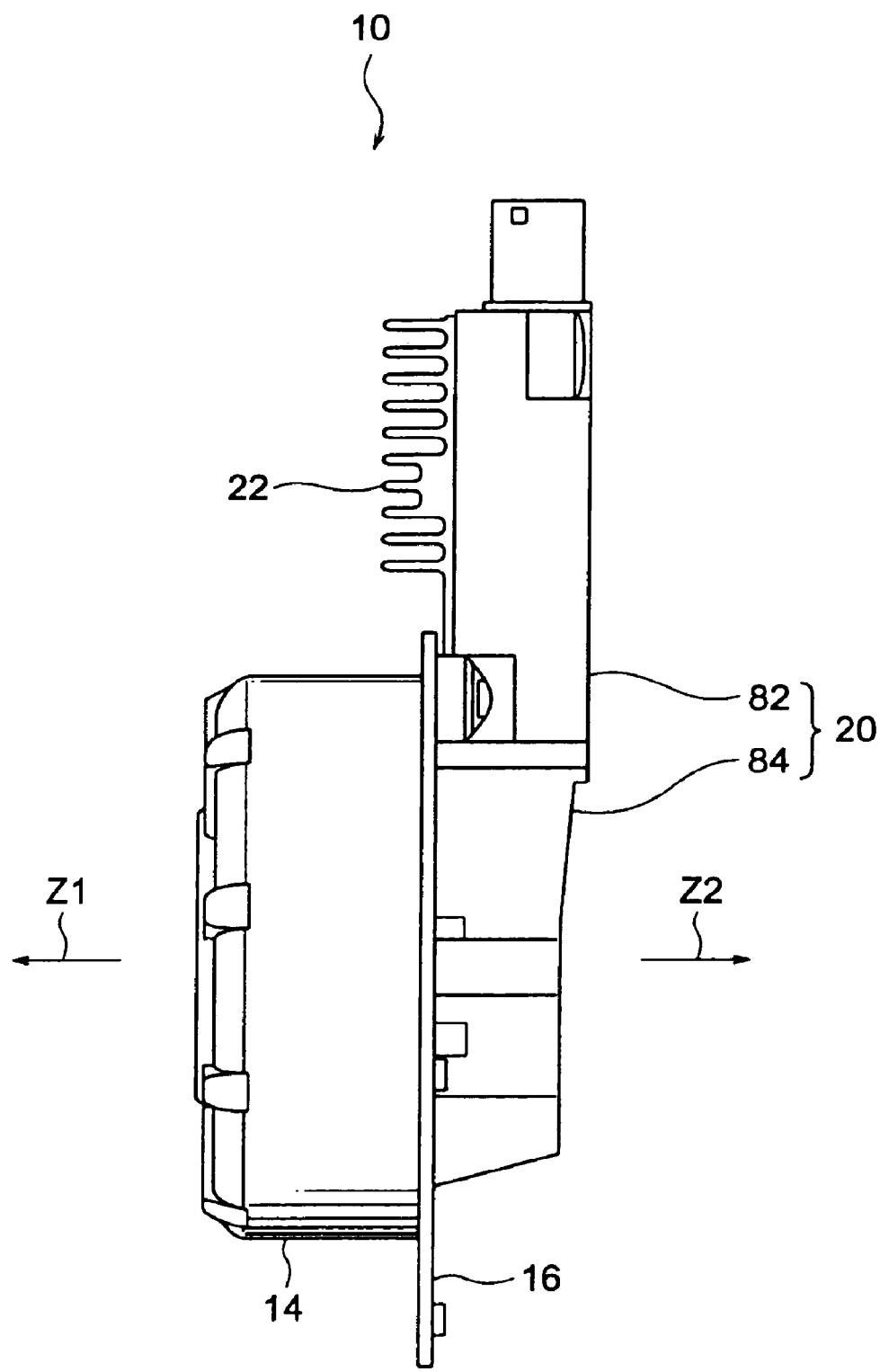
FIG. 2 is a side view of the brushless motor of the embodiment.
Figure 3:
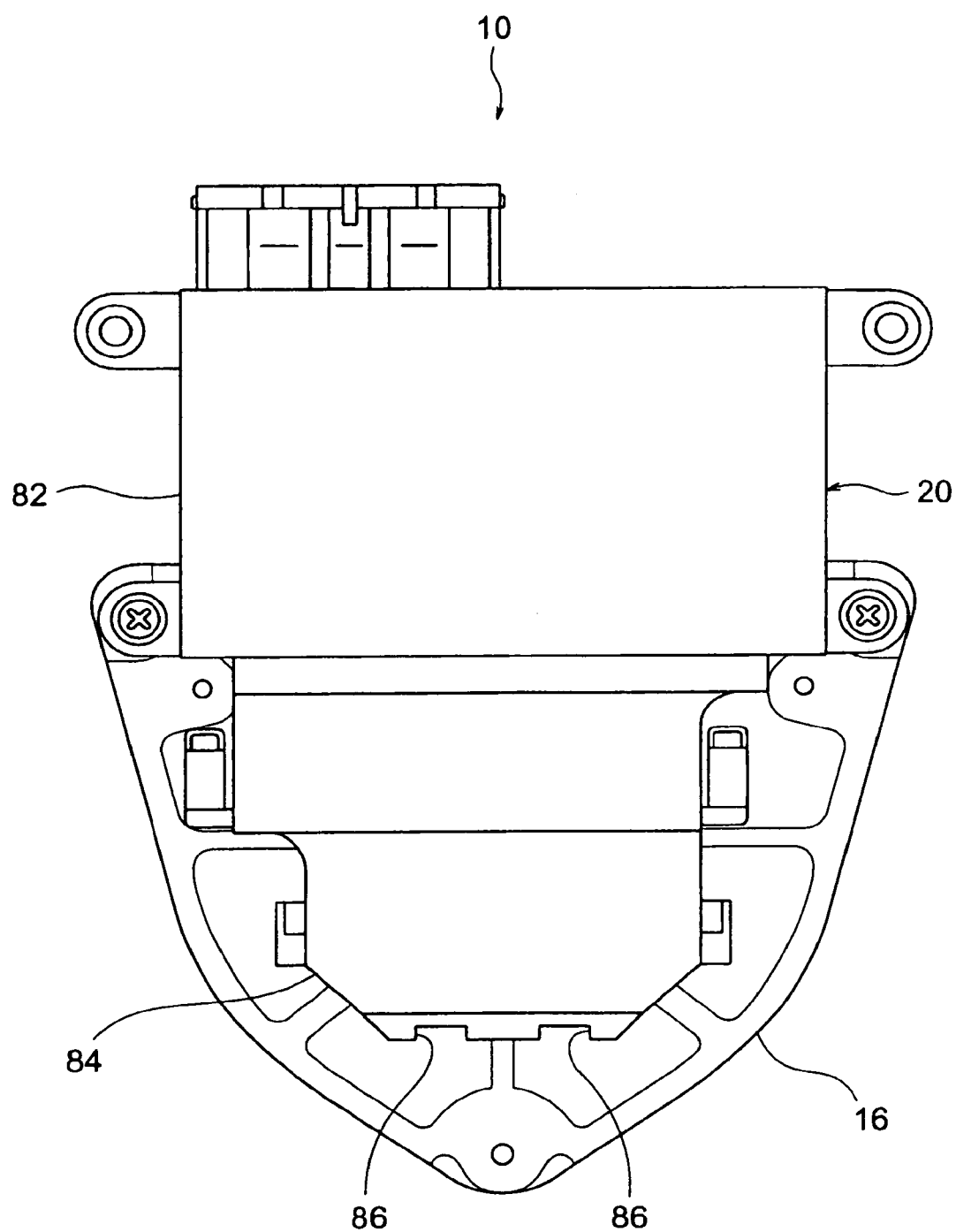
FIG. 3 is a bottom view of the brushless motor of the embodiment.

The control unit 20 includes the control circuit 82 and a unit case 84. As shown in FIG. 2, the heat sink 22 is installed integrally to the control circuit 82. Furthermore, as shown in FIGS. 3 and 4, a plurality of cooling air inlet openings 86 is formed in the unit case 84.

Next, the manufacturing (assembling) of the brushless motor 10 having the above structure will be described.

FIGS. 8A to 8E show an assembling procedure of the brushless motor 10 according to the embodiment of the present invention.

Figure 8:
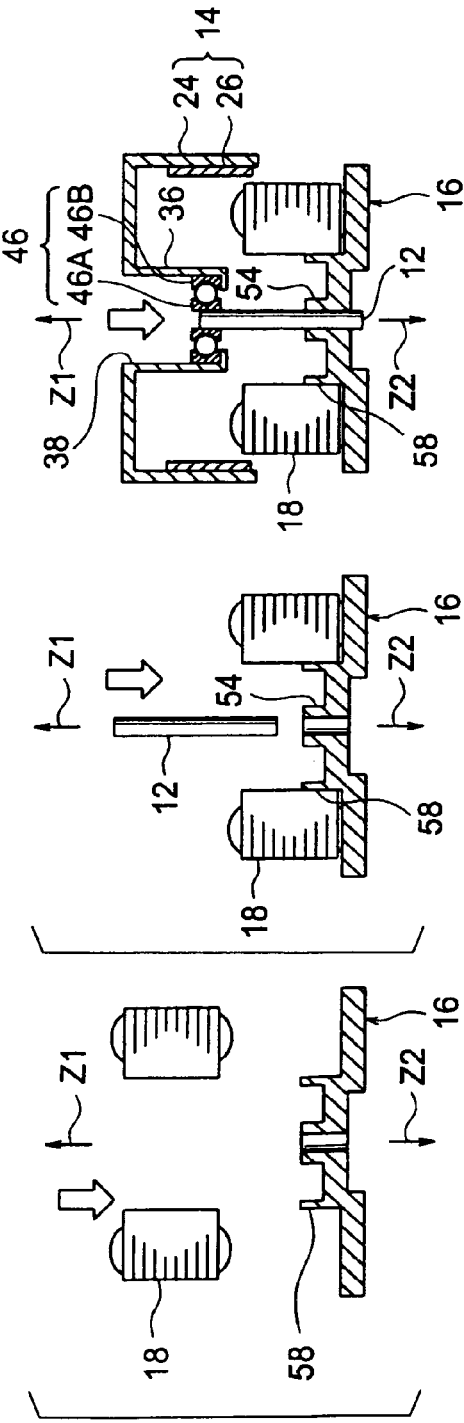
FIGS. 8A to 8E are schematic diagrams showing an assembling procedure of the brushless motor of the embodiment.

First, as shown in FIG. 8A, the stator 18 is installed to the axial wall 58 from the one axial side (the Z1 side), so that the stator 18 is held by the axial wall 58.

Next, as shown in FIG. 8B, the motor shaft 12 is installed to the motor shaft holder 54 from the one axial side (the Z1 side) and is thereby held in the motor shaft holder 54.

As shown in FIG. 8C, the second ball bearing 46 is inserted into the interior of the bearing holder 36 through the opening 38 from the one axial side (the Z1 side), so that the outer race 46B of the second ball bearing 46 is held by the inner peripheral surface of the bearing holder 36. Furthermore, the motor shaft 12 is inserted through the inner race 46A of the second ball bearing 46 from the other axial side (the Z2 side) until the inner race 46A contacts the motor shaft holder 54.

Next, as shown in FIG. 8D, the bush 48 and the spring 50 are received into the interior of the bearing holder 36 through the opening 38 from the one axial side (the Z1 side). Also, at this time, the motor shaft 12 is press fitted to the inner peripheral surface of the bush 48. The bush 48 and the spring 50 serve as an urging means.

As shown in FIG. 8E, the first ball bearing 44 is inserted into the interior of the bearing holder 36 through the opening 38 from the one axial side (the Z1 side), so that the outer race 44B of the first ball bearing 44 is held by the inner peripheral surface of the bearing holder 36. Furthermore, the one end portion of the motor shaft 12 on the one axial side (the Z1 side) is inserted into the inner race 44A of the first ball bearing 44.

Figure 9:
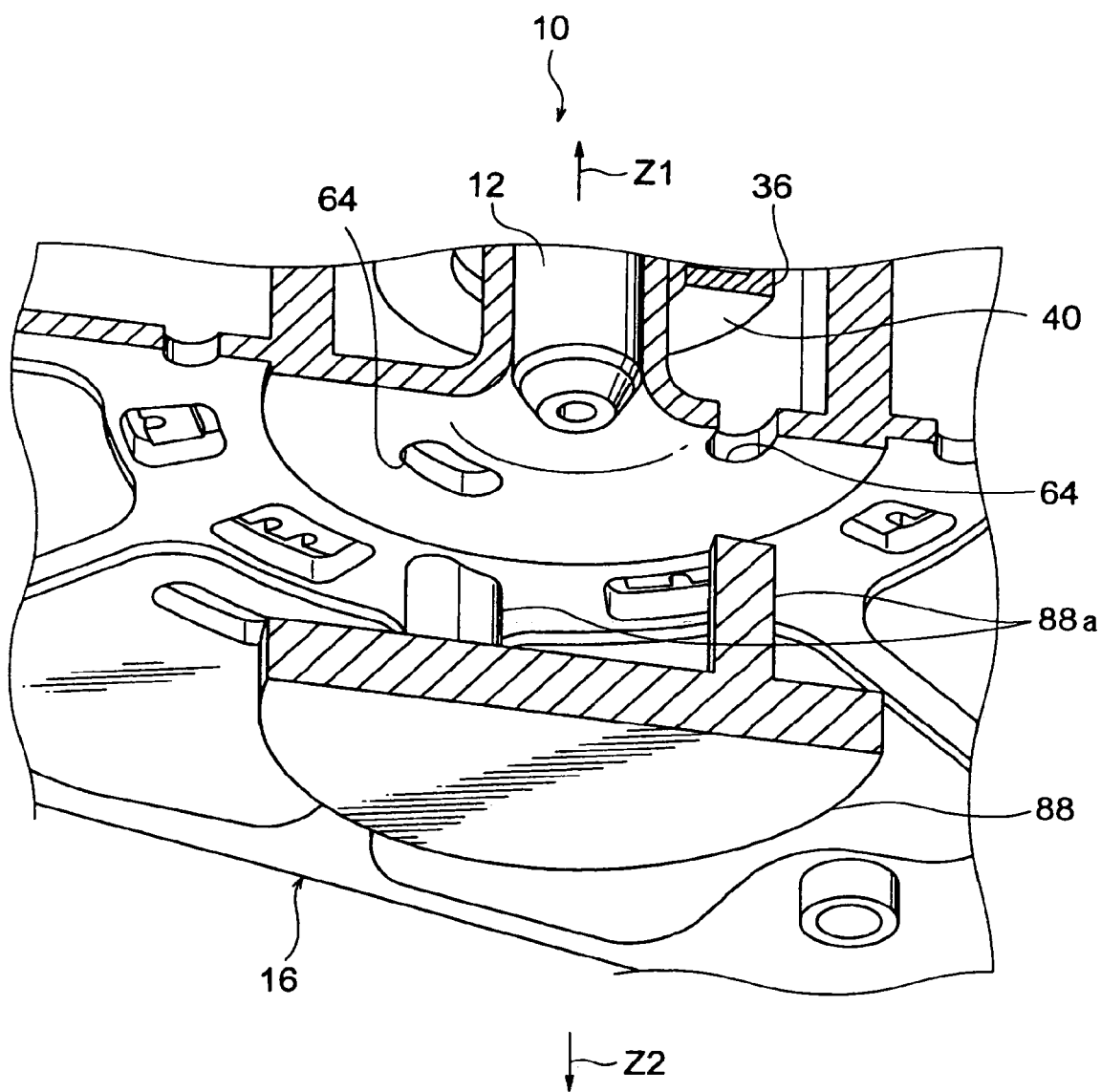
FIG. 9 is a partial perspective view showing an assembling work of the brushless motor of the embodiment.
Figure 10:
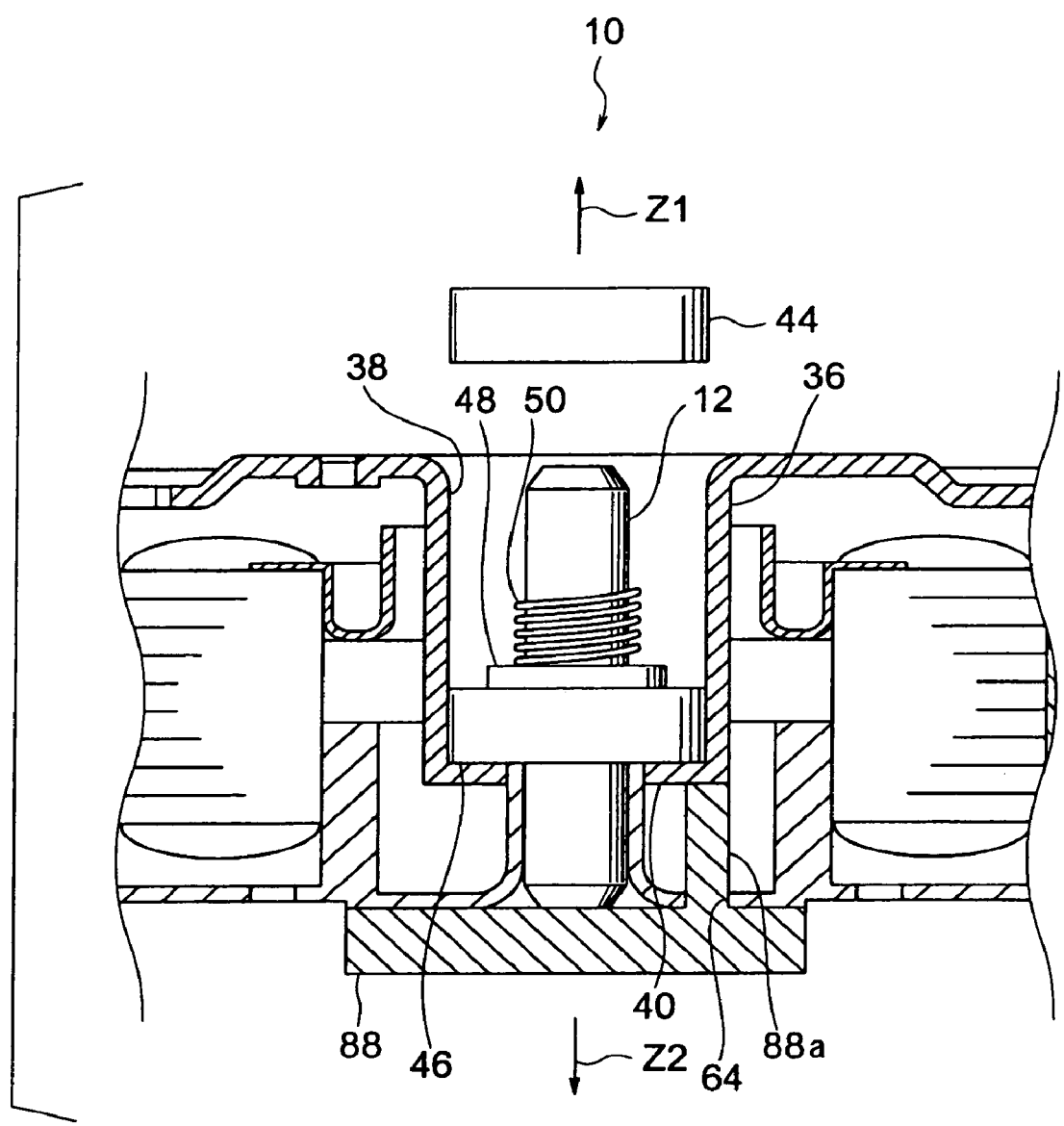
FIG. 10 is a partial cross sectional view showing the assembling work of the brushless motor of the embodiment.
Figure 11:
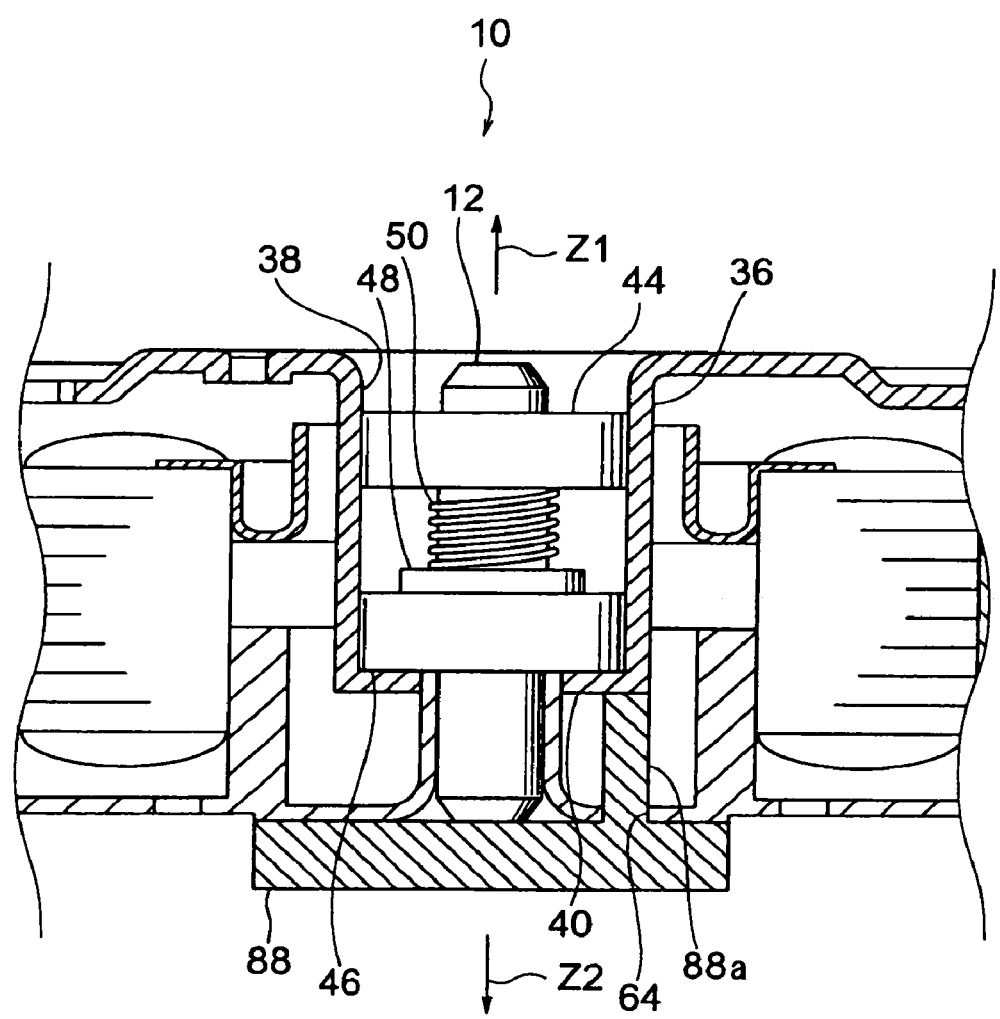
FIG. 11 is a partial cross sectional view showing the assembling work of the brushless motor of the embodiment.

Here, FIGS. 9 to 11 show details of this assembling step of the first ball bearing. Specifically, as shown in FIGS. 9 and 10, in the assembling step of the first ball bearing, three projections 88a of a jig 88 are axially inserted into the three cooling air inlet holes 64, respectively, from the other axial side (the Z2 side), so that distal ends of the projections 88a of the jig 88 contact the bottom portion 40 to support the bottom portion 40 from the other axial side (the Z2 side).

As shown in FIGS. 10 and 11, in the state where the projections 88a of the jig 88 axially support the bottom portion 40 from the other axial side (the Z2 side), the first ball bearing 44 is inserted into the interior of the bearing holder 36 through the opening 38 from the one axial side (the Z1 side). Thereby, the outer race 44B of the first ball bearing 44 is held by the inner peripheral surface of the bearing holder 36, and the one end portion of the motor shaft 12 on the one axial side (the Z1 side) is inserted into the inner race 44A of the first ball bearing 44.

As discussed above, according to the embodiment, in the assembling step of the first ball bearing 44, the jig 88 is used to insert the motor shaft 12 into the inner race 44A of the first ball bearing 44 at the time of press fitting the first ball bearing 44 into the bearing holder 36, so that, for example, deformation of the other part (e.g., the bottom portion 30) of the rotor 14 can be advantageously limited.

Next, the control unit 20 and the heat sink 22, which are shown in FIGS. 1 to 4, are installed to the centerpiece 16. In this way, the assembling of the brushless motor 10 of the present embodiment is completed.

The present embodiment provides the following advantages.

In the brushless motor 10 of the present embodiment, the first ball bearing 44 and the second ball bearing 46 can be easily installed into the interior of the bearing holder 36 through the opening 38 from the common side, i.e., from the one axial side (the Z1 side). In this way, it is not required to invert the rotor 14 at the time of installing the first ball bearing 44 and the second ball bearing 46 to the bearing holder 36. Therefore, the work efficiency can be improved, and the costs can be reduced.

Also, in the brushless motor 10 of the present embodiment, the projections 88a of the jig 88 are inserted into the corresponding cooling air inlet holes 64, respectively, from the other axial side (the Z2 side) such that the distal ends of the projections 88a of the jig 88 contact the bottom portion 40. In this way, the bottom portion 40 can be axially supported with the projections 88a of the jig 88 from the other axial side (the Z2 side). Also, in this state, the first ball bearing 44 is inserted into the interior of the bearing holder 36 through the opening 38 from the one axial side (the Z1 side), so that the outer race 44B of the first ball bearing 44 is held by the inner peripheral surface of the bearing holder 36, and the one end portion of the motor shaft 12 on the one axial side (the Z1 side) is inserted into the inner race 44A of the first ball bearing 44.

In this way, it is possible to improve the workability at the time of inserting the first ball bearing 44 into the bearing holder 36. Therefore, the work efficiency can be improved, and the costs can be reduced.

Furthermore, in the brushless motor 10 of the present embodiment, the bush 48 and the spring 50 are installed into the interior of the bearing holder 36 through the opening 38 from the one axial side (the Z1 side) in the direction, which is the common direction that is the same as the installation direction of the first ball bearing 44 and the second ball bearing 46 into the interior of the bearing holder 36. Therefore, it is not required to invert the rotor 14 in order to install the bush 48 and the spring 50 into the bearing holder 36. In this way, the work efficiency can be improved, and the costs can be reduced.

As discussed above, the brushless motor 10 of the present embodiment enables the cost reduction, so that it is possible to provide the inexpensive vehicle fan motor to the market.

Now, in order to provide the clear understanding of the advantages of the present embodiment, comparative examples will be described.

Figure 14:
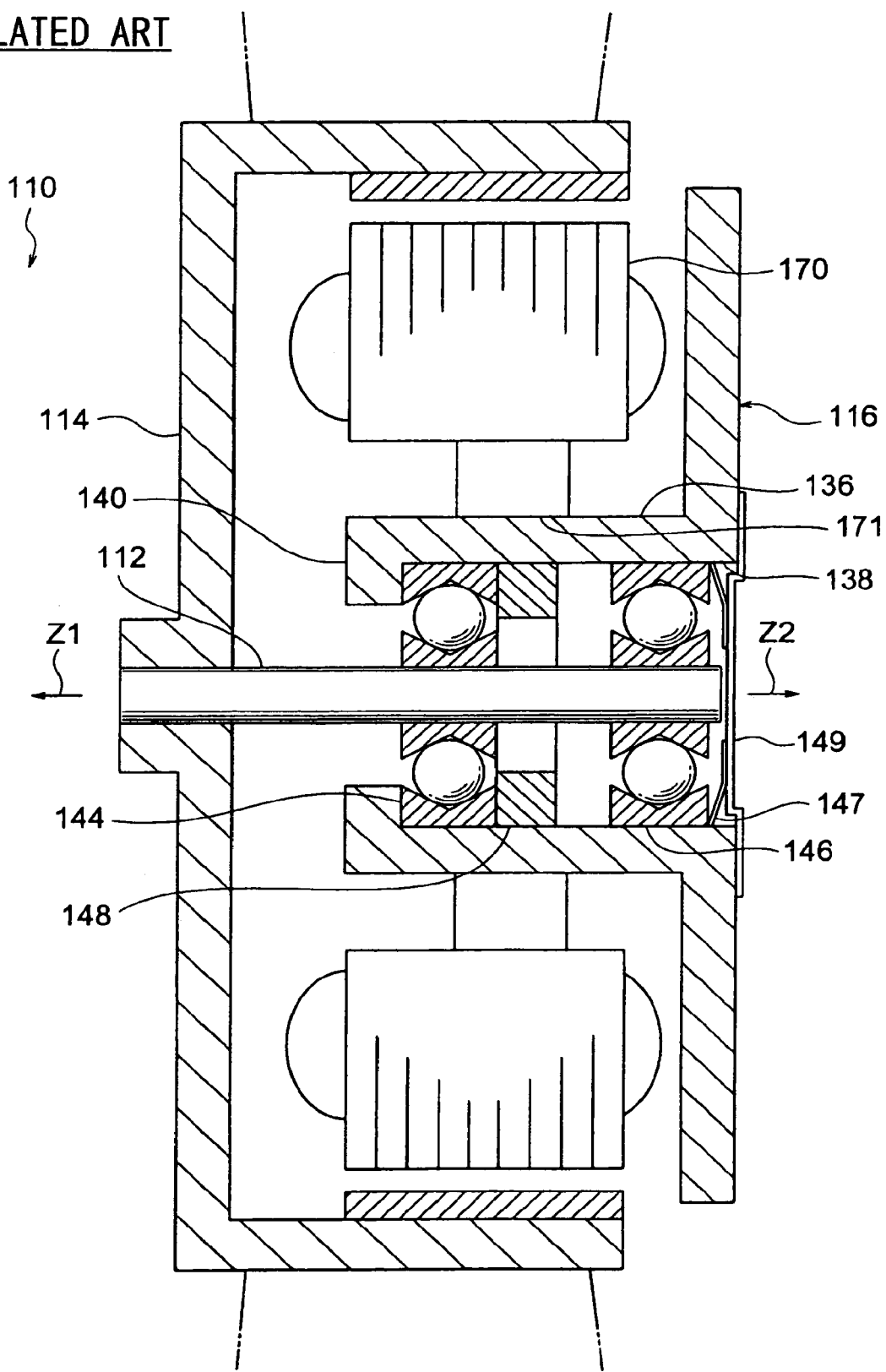
FIG. 14 is a partial enlarged cross sectional view of a first comparative example of the brushless motor.
Figure 16:
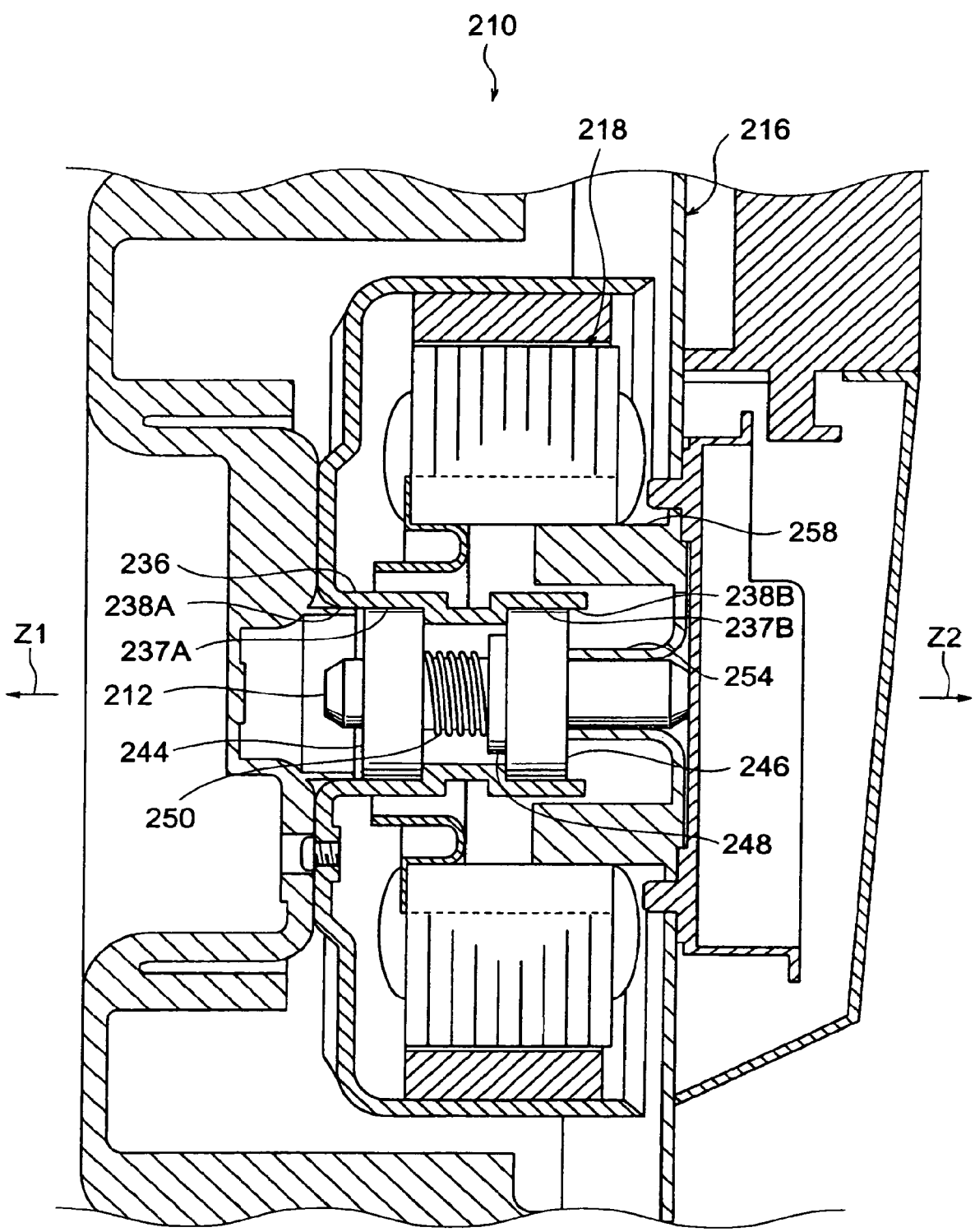
FIG. 16 is a partial enlarged cross sectional view of a second comparative example of the brushless motor.

FIG. 14 shows a cross sectional view of a brushless motor 110 of a first comparative example, and FIGS. 15A to 15F show an assembling procedure of the brushless motor 110 of the first comparative example. Furthermore, FIG. 16 shows a cross sectional view of a brushless motor 210 of a second comparative example, and FIGS. 17A to 17F show an assembling procedure of the brushless motor 210 of the second comparative example.

As shown in FIG. 14, the brushless motor 110 of the first comparative example has a generally cylindrical bearing holder 136, which is provided at a center part of a centerpiece 116 and axially extends toward the one axial side (the Z1 side). The bearing holder 136 is securely press fitted into an axial hole 171, which is formed in a stator core 170. In this way, the centerpiece 116 and the stator core 170 are integrally fixed.

The bearing holder 136 has a bottom portion 140 at the one axial side (the Z1 side) and an opening 138 at the other axial side (the Z2 side). A first ball bearing 144, a bush 148, a second ball bearing 146 and a wave washer 147 are installed into an interior of the bearing holder 136 in this order from the one axial side (the Z1 side) toward the other axial side (the Z2 side). The wave washer 147 axially urges the second ball bearing 146 away from a support plate 149 toward the one axial side (the Z1 side).

The motor shaft 112 is supported by the first ball bearing 144 and the second ball bearing 146 in a rotatable manner relative to the centerpiece 116. A rotor 114 is fixed to the one end portion of the motor shaft 112 on the one axial side (the Z1 side) to rotate integrally with the motor shaft 112.

The brushless motor 110 of the first comparative example is assembled in the assembling order shown in FIGS. 15A to 15F.

As shown in FIG. 15A, the centerpiece 116 is inverted to place the opening 138 toward the one axial side (the Z1 side). In this state, the first ball bearing 144 and the bush 148 are installed into the interior of the bearing holder 136 from the one axial side (the Z1 side) through the opening 138.

Next, as shown in FIG. 15B, the centerpiece 116 is inverted to place the opening 138 toward the other axial side (the Z2 side). In this state, the stator 118 is installed into the bearing holder 136 from the one axial side (the Z1 side), so that the stator 118 is held by the bearing holder 136.

Then, as shown in FIG. 15C, in the state where the rotor 114 is fixed to the one end portion of the motor shaft 112 on the one axial side (the Z1 side), the motor shaft 112 is installed into the first ball bearing 144 from the one axial side (the Z1 side) and is fixed.

As shown in FIG. 15D, the centerpiece 116 is inverted once again to place the opening 138 toward the one axial side (the Z1 side). In this state, the second ball bearing 146 is installed into the interior of the bearing holder 136 from the one axial side (the Z1 side) through the opening 138.

As shown in FIG. 15E, the wave washer 147 is installed into the interior of the bearing holder 136 from the one axial side (the Z1 side) through the opening 138. Furthermore, as shown in FIG. 15F, the support plate 149 is installed to the centerpiece 16 from the one axial side (the Z1 side). Thereby, the assembling of the brushless motor 110 of the first comparative example is completed.

In the case of the brushless motor 110 of the first comparative example, the rotor 114 needs to be inverted multiple times in order to install the first ball bearing 144 and the second ball bearing 146 into the bearing holder 136 from the same direction. Therefore, the work efficiency is reduced, and the costs are increased.

Also, in the brushless motor 110 of the first comparative example, the bearing holder 136 is placed radially inward of the stator 118, around which the windings (heating elements) are wound. Therefore, the heat can be easily transmitted to the first ball bearing 144 and the second ball bearing 146, which are received in the bearing holder 136, from the stator 118. Therefore, the first ball bearing 144 and the second ball bearing 146 need to be highly heat resistant ball bearings (e.g., ball bearings, to which heat resistant grease is applied or is heat treated), so that the costs are disadvantageously increased.

Furthermore, in the brushless motor 110 of the first comparative example, the rotor 114 is held only at the one end portion of the motor shaft 112 on the one axial side (the Z1 side), so that the length of holding portion of the motor shaft 112, which holds the rotor 114, becomes relatively short. Thereby, the rotor 114 can be easily tilted relative to the motor shaft 112, so that the unbalance of the rotor 114 may possibly occur. As a result, an adjustment work for compensating the unbalance of the rotor 114 is required, so that the costs are disadvantageously increased.

Furthermore, as shown in FIG. 16, in the brushless motor 210 of the second comparative example, two large diameter portions (increased diameter portions) 237A, 237B are formed at two axial sides, respectively, of an inner bore of a bearing holder 236. The first ball bearing 244 and the second ball bearing 246 are held in the large diameter portions 237A, 237B, respectively. The bearing holder 236 has a first opening 238A and a second opening 238B at two opposed axial ends, respectively, of the bearing holder 236.

The brushless motor 210 of the second comparative example is assembled in the assembling order shown in FIGS. 17A-17F.

Figure 17A:
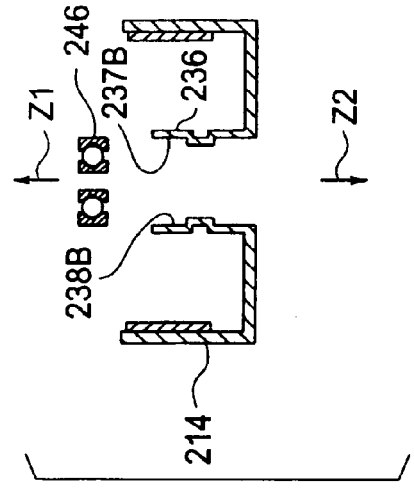
FIGS. 17A to 17F are schematic diagrams showing an assembling procedure of the second comparative example of the brushless motor.

First, as shown in FIG. 17A, the stator 218 is installed to the axial wall 258 from the one axial side (the Z1 side), so that the stator 218 is held by the axial wall 258.

Figure 17B:
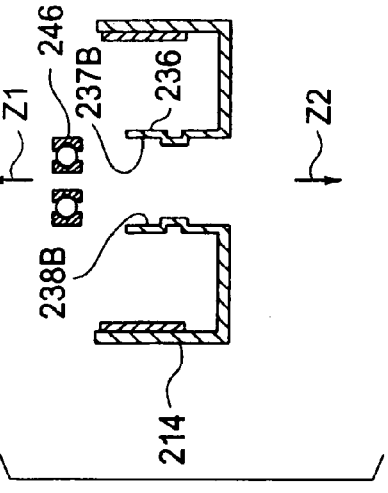

Next, as shown in FIG. 17B, a motor shaft 212 is installed to the motor shaft holder 254 from the one axial side (the Z1 side) and is thereby held in the motor shaft holder 254.

Figure 17C:
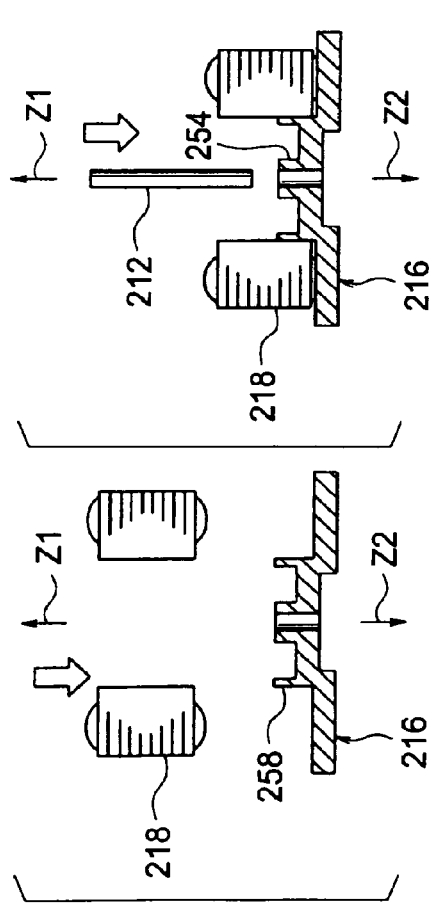

As shown in FIG. 17C, a rotor 214 is inverted to place a second opening 238B toward the one axial side (the Z1 side). In this state, the second ball bearing 246 is installed into the interior of the large diameter portion 237B of the bearing holder 236 from the one axial side (the Z1 side) through the second opening 238B.

Figure 17D:
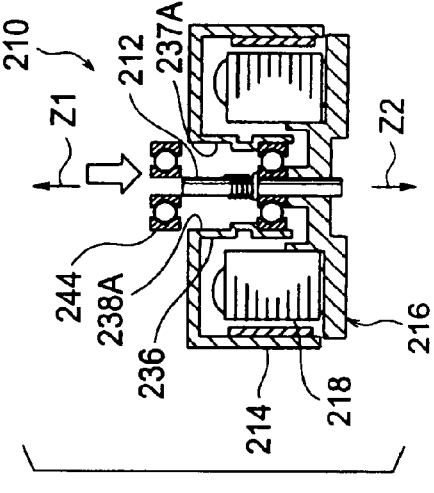

Next, as shown in FIG. 17D, the rotor 214 is inverted to place the second opening 238B toward the other axial side (the Z2 side). In this state, the motor shaft 212 is installed through the inner race of the second ball bearing 246 from the other axial side (the Z2 side) until the second ball bearing 246 contacts the axial wall 258.

Figure 17E:
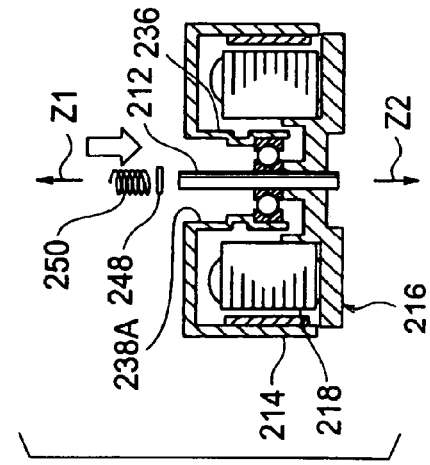

Next, as shown in FIG. 17E, a bush 248 and a spring 250 are received into the interior of the bearing holder 236 through the first opening 238A from the one axial side (the Z1 side).

Figure 17F:
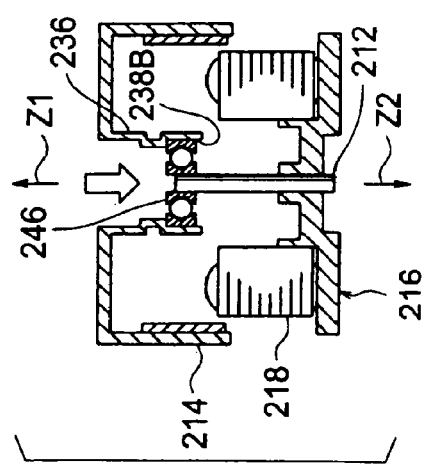

As shown in FIG. 17F, the first ball bearing 244 is installed into the interior of the large diameter portion 237A of the bearing holder 236 through the first opening 238A from the one axial side (the Z1 side), and the portion of the motor shaft 212 at the one axial side (the Z1 side) is inserted through the inner race of the first ball bearing 244. Thereby, the assembling of the brushless motor 210 of the second comparative example is completed.

In the brushless motor 210 of the second comparative example, the two large diameter portions 237A, 237B are formed at the two axial sides, respectively, of the inner bore of the bearing holder 236. The first ball bearing 244 and the second ball bearing 246 are held in the large diameter portions 237A, 237B, respectively. Therefore, in order to install the first ball bearing 244 and the second ball bearing 246 into the bearing holder 236 in the common direction, the rotor 214 needs to be inverted after the installation of the second ball bearing 246 into the bearing holder 236 prior to the installation of the first ball bearing 244 into the bearing holder 236. Therefore, the work efficiency is reduced, and the costs are increased.

Also, in the brushless motor 210 of the second comparative example, the bearing holder 236 is placed radially inward of the stator 218, around which the windings (serving as the heating elements) are wound. Therefore, the heat can be easily transmitted to the first ball bearing 244 and the second ball bearing 246, which are received in the bearing holder 236, from the stator 218. Therefore, the first ball bearing 244 and the second ball bearing 246 need to be highly heat resistant, thereby resulting in the increased costs.

Unlike the above first and second comparative examples, the brushless motor 10 of the present embodiment does not require the inverting of the rotor 14 at the time of installing the first ball bearing 44 and the second ball bearing 46 into the bearing holder 36. Therefore, the work efficiency can be improved, and the costs can be reduced.

Furthermore, in the brushless motor 10 of the present embodiment, the cooling air inlet holes 64 axially penetrate through the connecting wall 62, which connects between the motor shaft holder 54 and the axial wall 58 at the other axial side (the Z2 side) of the motor shaft holder 54 and the axial wall 58. Therefore, as indicated by arrows A in FIG. 4, when the blower fan 32 is rotated, the cooling air is introduced into the motor interior from the cooling air inlet openings 86 through the cooling air inlet holes 64, and this introduced cooling air can be applied to the bearing holder 36.

Furthermore, the axial wall 58 is provided radially outward of the bearing holder 36 while the gap 60 is interposed between the axial wall 58 and the bearing holder 36. The axial wall 58 extends in the axial direction of the motor shaft 12 such that the axial wall 58 overlaps with the part of the bearing holder 36, which is located on the other axial side (the Z2 side), in the axial direction of the motor shaft 12. Therefore, the cooling air, which is introduced through the cooling air inlet holes 64, can be guided by the axial wall 58 along the outer peripheral surface of the bearing holder 36.

In this way, the first ball bearing 44 and the second ball bearing 46, which are received in the bearing holder 36, can be effectively cooled, so that it is not required to use the highly heat resistant ball bearings as the first ball bearing 44 and the second ball bearing 46. Thereby, the costs can be reduced.

Furthermore, in the brushless motor 10 of the present embodiment, as indicated by the arrows A in FIG. 4, the cooling air, which is introduced through the cooling air inlet holes 64, can be discharged to the side of the stator 18 on the one axial side (the Z1 side) from the gap 60 through the communication passage 76. In this way, the outer peripheral surface of the bearing holder 36 can be exposed to the cooling air along the axial direction. Thereby, the first ball bearing 44 and the second ball bearing 46, which are received in the interior of the bearing holder 36, can be further cooled.

Furthermore, in the brushless motor 10 of the present embodiment, the first ball bearing 44 and the second ball bearing 46 are received in the bearing holder 36 such that the first ball bearing 44 and the second ball bearing 46 are spaced from each other in the axial direction of the motor shaft 12. Therefore, it is possible to have the relatively long distance between the first ball bearing 44 and the second ball bearing 46, which support the rotor 14 in the rotatable manner relative to the motor shaft 12. As a result, the more desirable rotational balance of the rotor 14 relative to the motor shaft 12 can be achieved. Thus, it is possible to abolish the adjustment work for compensating the unbalance of the rotor 14, so that the costs can be reduced.

The brushless motor 10 of the present embodiment provides the following advantages besides the above described advantages over the above comparative examples. That is, the winding cooling holes 68 are formed in the main body 52 of the centerpiece 16, so that the cooling air can be introduced into the motor interior through the winding cooling holes 68. Furthermore, this introduced cooling air can be discharged through the cooling air outlet openings 34 after passing through the slots 80. Therefore, the windings 74, which are wound at the slots 80, can be also cooled with the cooling air.

Also, in the brushless motor 10 of the present embodiment, the inner peripheral surface of the stator 18 is fitted to the outer peripheral surface of the axial wall 58. Thus, for example, as indicated by arrows B in FIG. 4, even when the water intrudes into the motor interior through the axial gap between the rotor 14 and the centerpiece 16, the further intrusion of the water toward the radially inside of the axial wall 58 can be limited. Thereby, it is possible to limit the application of the water to the first ball bearing 44 and the second ball bearing 46. As a result, it is not required to use water resistant ball bearings (e.g., seal type ball bearings, which use a contact rubber) as the first ball bearing 44 and the second ball bearing 46, thereby allowing the cost reduction. Also, the sliding loss of the first ball bearing 44 and the second ball bearing 46 can be reduced.

Furthermore, in the brushless motor 10 of the present embodiment, the bottom portion 30 of the rotor housing 24 and a bottom portion 33 of the blower fan 32 are tightly engaged with each other. Thereby, it is possible to limit the intrusion of the water into the motor interior through the gap between the bottom portion 30 of the rotor housing 24 and the bottom portion 33 of the blower fan 32.

In the brushless motor 10 of the present embodiment, the inner race 46A of the second ball bearing 46 can be supported by the end of the motor shaft holder 54, which is located on the one axial side (the Z1 side), from the other axial side (the Z2 side). Furthermore, the inner race 44A of the first ball bearing 44 can be urged by the spring 50 away from the inner race 46A of the second ball bearing 46 toward the one axial side (the Z1 side).

Thereby, the pre-load can be applied to the inner race 44A of the first ball bearing 44 and the outer race 46B of the second ball bearing 46. Thus, it is possible to limit the looseness (rattling, jouncing) of the inner race and the outer race in each of the first ball bearing 44 and the second ball bearing 46. In this way, it is possible to increase the lifetime of the first ball bearing 44 and the second ball bearing 46.

Furthermore, in the brushless motor 10 of the present embodiment, the second ball bearing 46 is supported by the bush 48 and the motor shaft holder 54 from the opposite axial sides, respectively. Therefore, even when the relatively large vibrations are applied to the second ball bearing 46 through the motor shaft 12, application of an excessive force to the spring 50, which applies the pre-load, can be limited. In this way, the reliability of the spring 50 can be increased.

The embodiment of the present invention has been described above. However, the present invention is not limited to the above embodiment, and the above embodiment may be modified in various ways without departing from the spirit and scope of the present invention.

For example, in the above embodiment, the axial wall 58 is constructed to overlap with the part of the bearing holder 36, which is located on the other axial side (the Z2 side), in the axial direction of the motor shaft 12. Alternatively, the axial wall 58 may be overlapped with the entire axial extent of the bearing holder 36 in the axial direction of the motor shaft 12.

For example, in the above embodiment, as shown in FIG. 5, the motor shaft holder 54 projects from the center part of the main body 52 toward the one axial side (the Z1 side). This may be modified as follows.

Figure 12:
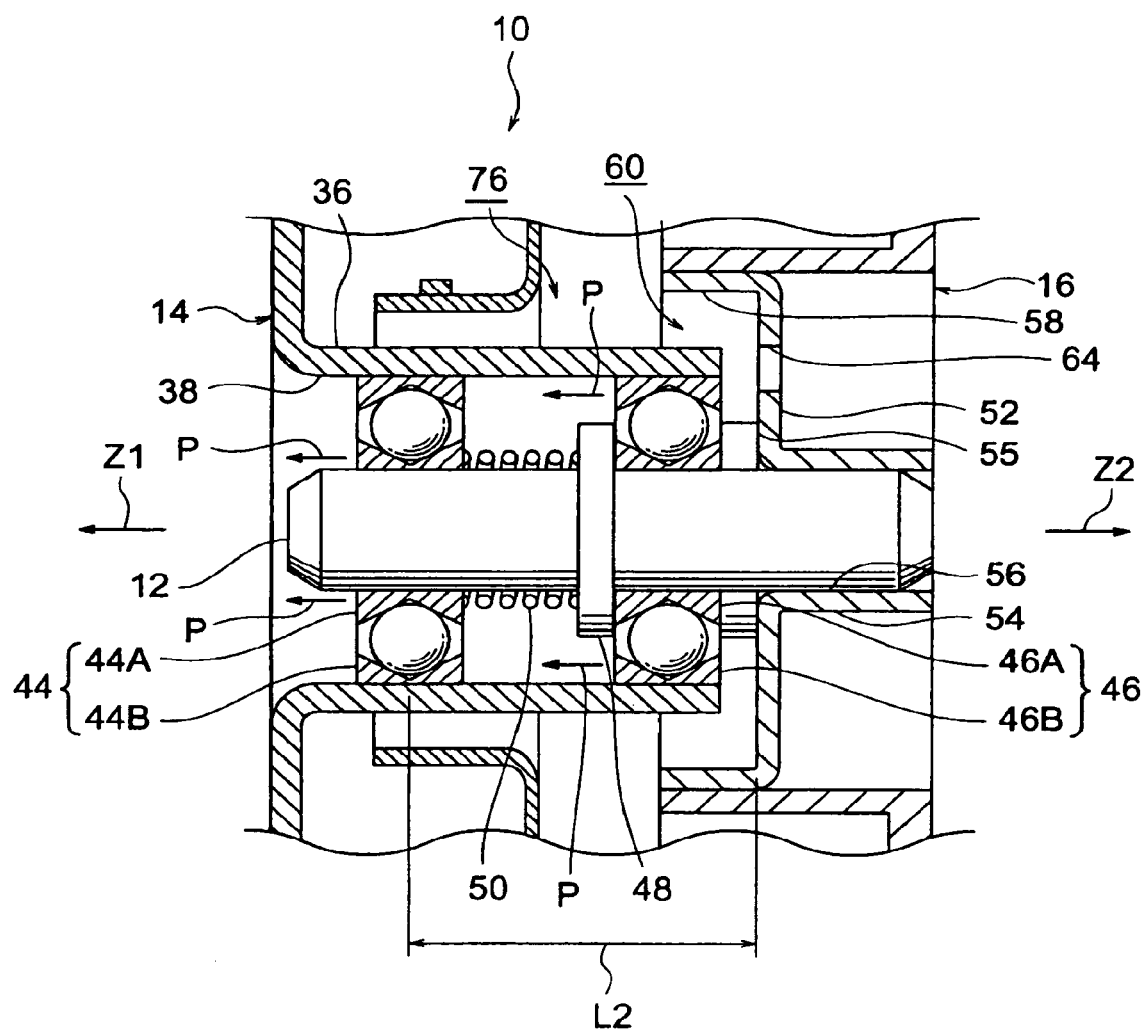
FIG. 12 is a schematic cross sectional view showing a modification of the brushless motor of the embodiment.

That is, in a modification shown in FIG. 12, the motor shaft holder 54 projects from the center part of the main body 52 toward the other axial side (the Z2 side).

Also, a washer (stopper) 55 is interposed between the motor shaft holder 54 and the inner race of the second ball bearing 46. The part of the motor shaft holder 54, which is located on the one axial side (the Z1 side), supports the inner race 46A of the second ball bearing 46 from the other axial side (the Z2 side) through the washer 55.

With this construction, a distance L2 from the first ball bearing 44 to the main body 52 of the centerpiece 16 in this modification can be made shorter in comparison to a distance L1 from the first ball bearing 44 to the main body 52 of the centerpiece 16 in the case of FIG. 5 (i.e., L2<L1). Thus, even when a bending force is applied from the rotor 14 to the motor shaft 12 through the first ball bearing 44, a bending moment applied to the main body 52 of the centerpiece 16 and the motor shaft holder 54 can be limited to a relatively small value. In this way, wobbling of the motor shaft 12 can be limited.

In this modification, the washer 55 is used. In place of the washer 55, a flange, which is similar to the washer 55, may be formed in the motor shaft 12 through, for example, a cold forging process.

Furthermore, in the above embodiment, the brushless motor 10 is used as the fan motor of the vehicle. Alternatively, the brushless motor 10 may be used in any other applications.

In the above embodiment, the stator 18 is installed to the axial wall 58 of the centerpiece 16 before the installation of the motor shaft 12 to the motor shaft holder 54. Alternatively, the motor shaft 12 may be installed to the motor shaft holder 54 before the installation of the stator 18 to the axial wall 58. Furthermore, in the above embodiment, the second ball bearing 46 is installed into the bearing holder 36 after the installation of the motor shaft 12 to the motor shaft holder 54. Alternatively, the second ball bearing 46 may be installed to the motor shaft 12 and then to the bearing holder 36 before the installation of the motor shaft 12 to the motor shaft holder 54. Furthermore, the projections 88a of the jig 88 may be previously installed through the cooling air inlet openings 64 of the connecting wall 62 of the centerpiece 16 before the installation of the rotor 14.

Figure 13:
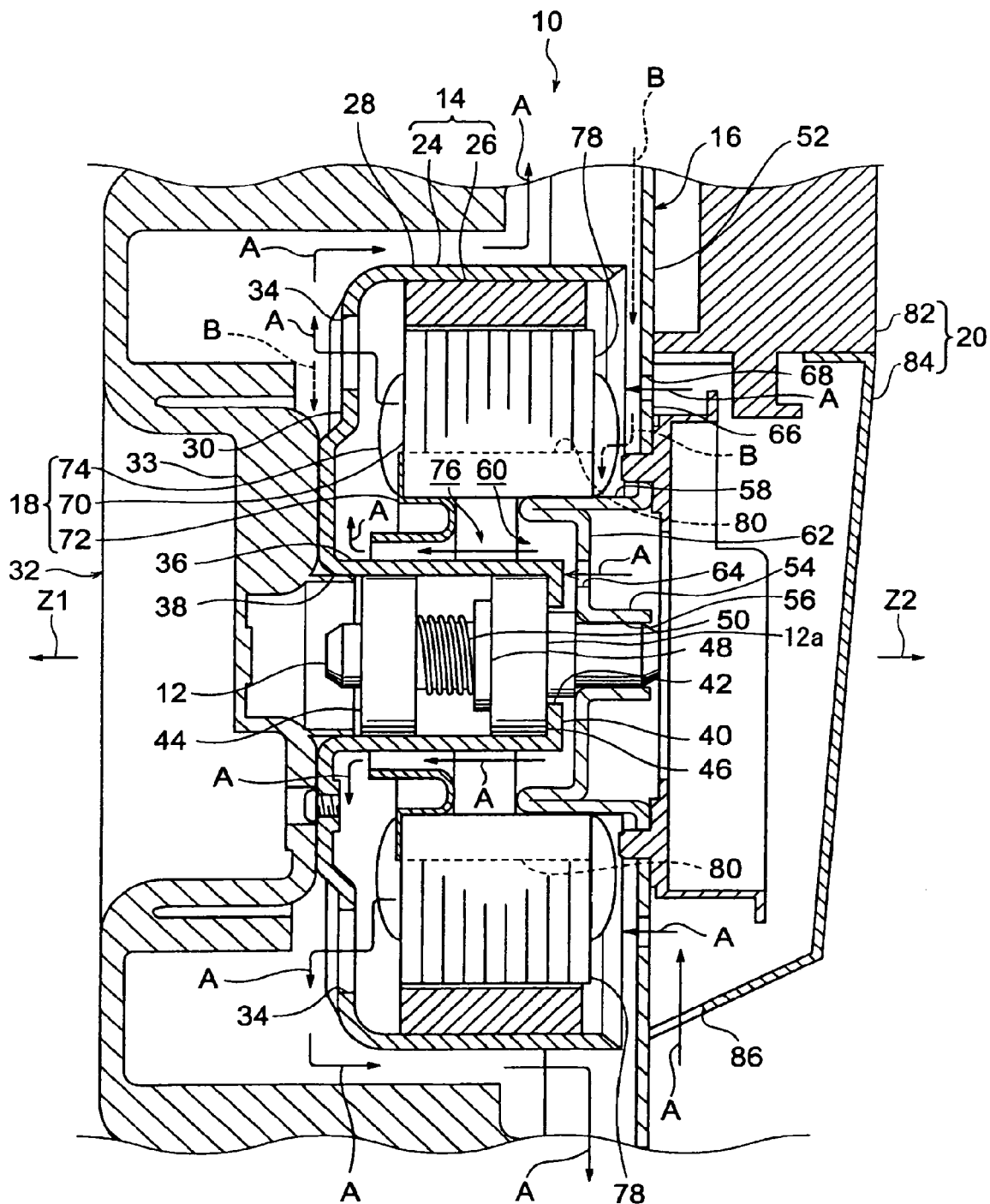
FIG. 13 is a schematic cross sectional view showing another modification of the brushless motor of the embodiment.

In the above embodiment, the centerpiece 16 is integrally formed through the die casting process. Alternatively, as shown in FIG. 13, the centerpiece 16 may be integrally formed through a press working process of a metal plate material. In the case of the modification shown in FIG. 13, the axial wall 58 and the motor shaft holder 54 are both formed by bending corresponding portions of the metal plate material. Unlike the above embodiment, the connecting wall 62 is placed on the one axial side (the Z1 side) of the motor shaft holder 54 at a location adjacent to the bottom portion 40 of the bearing holder 36. In order to limit direct contact between the bottom portion 40 of the bearing holder 36 and the connecting wall 62, a stopper 12a is formed integrally with the motor shaft 12 through, for example, a cold forging process, and is interposed between the inner race 46A of the second ball bearing 46 and the axial end of the motor shaft holder 54, which is placed adjacent to and is formed integrally with the connecting wall 62. Thus, the bearing holder 36 of the rotor 14 is effectively spaced from the connecting wall 62 of the centerpiece 16 by a predetermined axial gap to enable smooth rotation of the rotor 14. In this modification, the stopper 12a is formed integrally with the motor shaft 12. Alternatively, similar to the washer 55 of FIG. 12, the stopper 12a may be formed separately from the motor shaft 12 and may be installed to the motor shaft 12. Furthermore, in FIG. 13, the motor shaft holder 54 may be further axially extended toward a location where a center of mass of the rotor 14 is located. In this way, the rotation of the rotor 14 may be further stabilized.

In the above embodiment as well as the modifications thereof, the coil spring 50 is placed around the motor shaft 12. In place of the coil spring, a Belleville spring may be placed around the motor shaft 12.

Additional advantages and modifications will readily occur to those skilled in the art. The invention in its broader terms is therefore not limited to the specific details, representative apparatus, and illustrative examples shown and described.

What is claimed is:

1. A brushless motor comprising:
   a motor shaft that is stationary held and extends between a first axial side and a second axial side;
   a rotor that is rotatable about the motor shaft and includes a generally cylindrical bearing holder, which is placed on a radially outer side of the motor shaft and extends in an axial direction of the motor shaft;
   a centerpiece that is placed on the second axial side of the rotor and includes:
      a motor shaft holder that is coaxial with the bearing holder and securely holds the motor shaft;
      an axial wall that is placed radially outward of the motor shaft holder and of the bearing holder and is radially spaced from the bearing holder by a gap, wherein the axial wall extends in the axial direction of the motor shaft, and an axial extent of the axial wall at least partially overlaps with an axial extent of the bearing holder in the axial direction of the motor shaft; and
      a connecting wall that connects between the motor shaft holder and the axial wall on the second axial side of the bearing holder, wherein a plurality of cooling air inlet openings axially penetrates through the connecting wall in the axial direction of the motor shaft;
   a first ball bearing that is received in an interior of the bearing holder and has an inner race, which receives the motor shaft, and an outer race, which is held by an inner peripheral portion of the interior of the bearing holder;
   a second ball bearing that is received in the interior of the bearing holder and is axially spaced from the first ball bearing on the second axial side thereof, wherein the second ball bearing has an inner race, which receives the motor shaft, and an outer race, which is held by the inner peripheral portion of the interior of the bearing holder; and a stator that is securely held by the axial wall of the centerpiece and generates a rotational magnetic field to rotate the rotor upon energization of the stator.

2. The brushless motor according to claim 1, wherein:

the stator defines a communication passage between the stator and the bearing holder in the radial direction of the motor shaft; and the communication passage is communicated with the gap on the second axial side thereof and opens in the axial direction of motor shaft on the first axial side thereof.

3. The brushless motor according to claim 1, wherein:

the bearing holder has an opening, which opens in the axial direction of the motor shaft on the first axial side; and the bearing holder is configured to receive the first ball bearing and the second ball bearing into the interior of the bearing holder through the opening of the bearing holder from the first axial side.

4. The brushless motor according to claim 3, wherein:

the bearing holder has a bottom portion on the second axial side thereof;

the bottom portion of the bearing holder axially supports the outer race of the second ball bearing from the second axial side thereof; and a radial extent of each of the plurality of cooling air inlet openings at least partially overlaps with a radial extent of the bottom portion of the bearing holder in the radial direction of the motor shaft.

5. The brushless motor according to claim 1, wherein:

the bearing holder has:

an opening, which opens in the axial direction of the motor shaft on the first axial side; and a bottom portion, which is located on the second axial side to axially support the outer race of the second ball bearing from the second axial side thereof;

a through hole axially extends through the bottom portion in the axial direction of the motor shaft and is coaxial with the motor shaft holder;

the motor shaft holder axially supports the inner race of the second ball bearing from the second axial side thereof through the through hole; and the brushless motor further comprises an urging means for urging the inner race of the first ball bearing away the inner race of the second ball bearing in the axial direction of the motor shaft toward the first axial side.

6. The brushless motor according to claim 5, wherein the urging means includes:

a bush that is received in the interior of the bearing holder and is held by the motor shaft, wherein the bush has an inner peripheral portion that is held by the motor shaft, and the bush axially supports the inner race of the second ball bearing from the first axial side thereof; and a spring that is interposed between the bush and the first ball bearing.

7. The brushless motor according to claim 1, further comprising a blower fan, which is integrally rotatably fixed to the rotor, and the brushless motor serves as a fan motor of a vehicle.

8. The brushless motor according to claim 1, wherein the interior of the bearing holder has a generally constant inner diameter along a generally entire axial extent of the interior of the bearing holder.

* * * * *